United States Patent [19]

Seitz et al.

[11] 4,029,708
[45] June 14, 1977

[54] LINEAR SURFACTANT POLYMERS FORMED FROM SUBSTITUTED AMINES AND DIFUNCTIONAL REACTANTS

[75] Inventors: Paul L. Seitz; Robert K. Gabel, both of Houston, Tex.

[73] Assignee: Nalco Chemical Company, Oak Brook, Ill.

[22] Filed: Feb. 10, 1975

[21] Appl. No.: 548,463

[52] U.S. Cl. ............................. 260/584 B; 252/358; 260/429.9; 260/439 R; 260/448 A; 260/583 P

[51] Int. Cl.² .................. C07C 93/02; B01D 17/04; C07C 87/20

[58] Field of Search ..................... 260/584 B, 2 BP

[56] References Cited

UNITED STATES PATENTS

| 2,552,530 | 5/1951 | Groote | 260/584 B X |
| 2,697,118 | 12/1954 | Lundsted et al. | 260/584 B |
| 3,855,158 | 12/1974 | Petrovich et al. | 260/584 B X |

Primary Examiner—Daniel E. Wyman
Assistant Examiner—John J. Doll
Attorney, Agent, or Firm—John G. Premo; Barry W. Sufrin; Robert A. Miller

[57] ABSTRACT

Linear surfactant polymers, useful in waterflooding processes and as emulsion breakers, can be prepared by reacting various amines, such as hexamethylene diamine, with monofunctional pendant groups, such as propylene oxide, and then further reacting the substituted amines with a difunctional reactant, such as epichlorohydrin, to produce the polymer. The polymers may be combined with certain water-soluble metal salts to improve their efficiency as emulsion breakers and as coagulants.

7 Claims, No Drawings

LINEAR SURFACTANT POLYMERS FORMED FROM SUBSTITUTED AMINES AND DIFUNCTIONAL REACTANTS

This invention relates to new and useful linear surfactant polymers. The linear surfactant polymers are useful in the breaking of emulsions of oil and water, including oil-in-water emulsions and water-in-oil emulsions. Typical examples of such emulsions are petroleum emulsions which are obtained in crude oil exploration as well as its production and refining. These petroleum emulsions are generally water-in-oil emulsions wherein the oil acts as the continuous phase for the water which is dispersed throughout the oil. Such emulsions are quite stable and difficult to separate into the water and oil phases.

Oil-in-water emulsions are often encountered in the production and refining of crude oil. In this type emulsion the water acts as the continuous phase for the oil which is dispersed throughout the water. These are often quite stable and difficult to resolve into component parts without the aid of chemical treatment. The linear surfactant polymers of this invention have been used successfully to help separate the oil from the water in oil-in-water emulsions.

In addition, the linear surfactant polymers of this invention are useful as coagulants (or flocculants) for water clarification and emulsifiers and are also useful in waterflooding processes in which the polymer is injected into the oil-bearing formation in order to increase the quantity and flow of oil. This waterflooding process is widely known and in use today and is commonly referred to as secondary recovery of oil.

Water containing linear surfactant polymers is pumped into an injection well and forced throughout the oil-bearing formation to one or more producing wells. This technique helps increase the efficiency and production of the oil-bearing formation.

OBJECTS

It is therefore, an object of this invention to provide new and useful linear surfactant polymers.

It is also an object of this invention to provide linear surfactant polymers for use in resolving oil-in-water emulsions into their component parts of water and oil.

It is another object of this invention to provide linear surfactant polymers for use in resolving water-in-oil emulsions into their component parts of oil and water.

It is a further object of this invention to provide linear surfactant polymers for use in waterflooding processes.

It is a still further object of this invention to provide surfactant polymers for use as coagulants and emulsifiers.

THE INVENTION

This invention relates to linear surfactant polymers. These linear surfactant polymers are formed by the reaction of a substituted amine with a difunctional reactant. The substituted amine is formed by the reaction of an amine with a monofunctional pendant group.

The preferred amines useful in this invention are those having at least two primary amine groups. These include ethylene diamine, propylene diamine, diethylene triamine, dipropylene triamine, hexamethylene diamine, hexamethylene triamine, tetraethylene pentamine, and mixtures thereof.

The preferred monofunctional pendant groups include ethylene oxide, propylene oxide, butylene oxide, glycol adducts of epichlorohydrin, benzyl chloride, allyl chloride, ethyl chloride, methyl chloride, acrylic acid, crude tall oil and mixtures thereof. The preferred glycol adducts used are generally formed by reacting diethylene glycol or polyethylene glycol with epichlorohydrin in molar ratios from 3:1 to 1:1 at a temperature of 60°–110° C. for 1–3 hours under reflux conditions.

The amine is reacted with the monofunctional pendant group in a molar ratio of 5:1 to 1:5 with the preferred ratio being 2:1 to 1:2. The reaction is performed under a controlled temperature of 30°–130° C. with the preferred temperature range being 50°–120° C. However, depending upon the reactants and molar ratios thereof, oftentimes, the reaction range may exceed that listed above. Some reactions are performed at temperatures as high as 150°–220° C. The typical reaction time for this reaction is 1–4 hours, however, the reaction is generally completed within 3 hours.

The preferred difunctional reactants useful in the practice of this invention include glycol adducts of epichlorohydrin, epichlorohydrin, ethylene dichloride, 1,4-dichlorobutene-2, diepoxides, maleic anhydride, maleic acid, acrylic acid, allyl chloride, and mixtures thereof. Preferred glycol adducts of epichlorohydrin which are used as difunctional reactants in this invention include either mixed polyglycol or polyethylene glycol reacted with epichlorohydrin in a molar ratio of 2:1 to 1:2 at a temperature in the range of 60°–110° C. for 1–3 hours under reflux.

The difunctional reactant is reacted with the substituted amine in a molar ratio within the range of 5:1 to 1:5 with the preferred molar ratio being within the range of 1:1 to 1:3. The reaction is conducted at a temperature within the range of 100–250° C., preferably 120°–160° C. The reaction generally reaches completion in from 1–6 hours.

The linear surfactant polymer which is preferred as described above is generally neutralized with acid, but may also be advantageously used in the alkaline form. Preferably muriatic acid is used to neutralize in a concentration of 20–60% by weight. Other inorganic acids such as sulfuric, nitric and phosphoric may also be used, in addition to organic acids such as formic, acetic, propionic and the like.

Some of the preferred linear surfactant polymers of this invention are prepared from the constituents as listed in Table I below:

TABLE I

| Polymer No. | Amine | Monofunctional Pendant Group | Difunctional Reactant |
|---|---|---|---|
| 1 | hexamethylene diamine | propylene oxide | epichlorohydrin |
| 2 | hexamethylene triamine | propylene oxide | glycol adduct of epichlorohydrin (1 mole of PEG-250 reacted with 2 moles epichlorohydrin) |
| 3 | hexamethylene triamine | ethylene oxide | glycol adduct of epichlorohydrin (1 mole of PEG-250 reacted with 2 moles epichlorohydrin) |
| 4 | dipropylene triamine | propylene oxide | glycol adduct of polyglycol and |

TABLE 1-continued

| Polymer No. | Amine | Monofunctional Pendant Group | Difunctional Reactant |
|---|---|---|---|
| 5 | hexamethylene diamine | polyglycol adduct of epichlorohydrin (1 mole of polyglycol with 1 mole of epichlorohydrin) | epichlorohydrin ethylene dichloride |
| 6 | hexamethylene diamine + hexamethylene triamine mixture 120/50 | crude tall oil + polyglycol adduct of epichlorohydrin (1 mole mixed polyglycol reacted with 1 mole epichlorohydrin) | ethylene dichloride |
| 7 | hexamethylene diamine + hexamethylene triamine mixture 120/50 | crude tall oil | ethylene dichloride |
| 8 | ethylene diamine | propylene oxide | 1,4-dichlorobutene-2 |

Examples of the preparation of these polymers are listed below:

EXAMPLE 1 (Polymer 1)

To a 1000 ml. three-necked glass reactor, fitted with a stirrer, thermometer and a reflux condenser was added 232 grams of hexamethylene diamine. Then, 232 grams of propylene oxide were added to form the substituted amine by reacting for 2½ hours with mixing while the temperature was maintained between 50°–110° C. using a heating jacket and/or ice bath as needed to maintain the temperature within this range. After 2½ hours, 24 grams of epichlorohydrin were added to 136 grams of the substituted amine with mixing and the reaction was allowed to proceed for 2½ hours at a temperature within the range of 50°–140° C. Once the reaction reached completion, the temperature of the reaction mixture was allowed to cool to room temperature. Then the reaction mixture was neutralized with 82 grams of muriatic acid. The linear surfactant polymer formed was then isolated and extracted from the reaction vessel.

EXAMPLE 2 (Polymer 2)

A liter reaction vessel fitted with a stirrer, thermometer and reflux condenser was charged with 400 grams of hexamethylene triamine then 232 grams of propylene oxide were added over a 2 hour period. The reactants were allowed to proceed to completion at a temperature within the range of 35°–110° C. to form the substituted amine. The reaction time was approximately 3 hours.

In a separate reaction vessel, a difunctional reactant was formed by the reaction of 1.0 mole of a 250 molecular weight polyethylene glycol adducted with 2.0 moles of epichlorohydrin by reacting for 2 hours at a temperature of 60°–110° C.

142 grams of the difunctional reactant were added to 171 grams of the substituted amine formed above. The temperature was increased to 110° C. and the reaction was allowed to continue for 2½ hours at a temperature within the range of 110°–140° C. The linear substituted polymer was then isolated after it had been neutralized with 74 grams of muriatic acid.

EXAMPLE 3 (Polymer 4)

A 1500 ml. reaction vessel was charged with 573 grams of dipropylene triamine and 348 grams of propylene oxide. The reaction temperature was controlled to within the temperature range of 75°–110° C., and the reaction was completed in 2¾ hours.

Then, 156 grams of this substituted amine was reacted with 100 grams of a difunctional reactant which was prepared by reacting 1020 grams of a mixed polyglycol (approximately 4 moles) adducted with 880 grams of epichlorohydrin over a 3 hour period at a temperature within the range of 80°–110° C. This reaction was allowed to proceed for 2 hours at 100°–140° C. to produce a linear surfactant polymer. The polymer was neutralized with 115 grams of muriatic acid.

EXAMPLE 4 (Polymer 5)

To 165 grams of hexamethylene diamine were added 200 grams of a monofunctional pendant group formed by the reaction of 1060 grams of a mixed polyglycol (approximately 4 moles) adducted with 370 grams of epichlorohydrin at a temperature in the range of 60°–100° C, for 3 hours. This reaction was conducted at a 120°–140° C. and reached completion in 1½ hours.

To 365 grams of the substituted amine were added 50 grams of ethylene dichloride. The reaction proceeded for 2 hours at from 100°–130° C. The polymer was neutralized with 137 grams of muriatic acid.

EXAMPLE 5

A 500 ml. reaction vessel fitted with a stirrer, thermometer and reflux condenser was charged with 150 grams of hexamethylene diamine and 100 grams of a monofunctional pendant group formed by the reaction of 1060 grams of a mixed polyglycol (approximately 4 moles) adducted with 370 grams of epichlorohydrin at a temperature in the range of 60°–100° C. for 3½ hours. This reaction reached completion in 1 hour at 130°–145° C.

Then 250 grams of the substituted amine were reacted with 60 grams of ethylene dichloride and 50 grams of the difunctional reactant formed in Example 3 at a temperature of 135° C. for 3½ hours and then the polymer was neutralized with 97 grams of muriatic acid.

EXAMPLE 6 (Polymer 6)

To a 500 ml. reactor was added 120 grams of hexamethylene diamine and 50 grams hexamethylene triamine, with stirring to make a homogenous amine mixture. To this amine mixture was added 150 grams of crude tall oil and 100 grams of the monofunctional pendant group formed in Example 4. The reaction mixture was heated to a temperature of 160°–195° C. for 3 hours.

Then 170 grams of this substituted amine were reacted with 50 grams of ethylene dichloride for 3½ hours at 120°–140° C. and then the polymer was neutralized with 84 grams of muriatic acid.

EXAMPLE 7 (Polymer 7)

In the manner described in Example 5, 120 grams of hexamethylene diamine and 50 grams of hexamethylene triamine were reacted for 2 hours at 110°–200° C., with 100 grams of crude tall oil. To 170 grams of this substituted amine was added 50 grams of ethylene dichloride and reacted at a temperature of 130° C. and then neutralized with 184 grams of muriatic acid.

EXAMPLE 8 (Polymer 8)

In a manner described in Example 5, 180 grams of ethylene diamine were reacted with 696 grams of propylene oxide for 2 hours at a temperature of 75°–95° C. To 240 grams of this substituted amine were added 98 grams of 1,4-dichlorobutene -2 and the reaction was maintained at 80°–110° C. to form a polymeric quaternary ammonium chloride.

LINEAR SURFACTANT POLYMERS WITH CERTAIN WATER-SOLUBLE SALTS

The linear surfactant polymers may be used alone for such purposes as emulsion breaking or water clarification treatment and the like or they may be used in combination with certain heavy metal water-soluble salts. When used in conjunction with the linear surfactant polymers the heavy metal water-soluble salts may be blended therewith to provide between 5–40% by weight of the formulation. A preferred amount of metal salt added to the linear surfactant polymers ranges between 10°–30% of the formulation. The particular salts that may be combined with the linear surfactant polymers include such compounds as zinc, aluminum or iron salts, illustrated by the compounds zinc chloride, ferric sulfate, ferric chloride, aluminum chloride, aluminum sulfate and the like.

To facilitate the blending of these metal salts with the polymers, it is sometimes beneficial to use certain water-soluble alcohols such as lower aliphatic alcohols, e.g. methanol, ethanol, isopropanol and certain polyhydric alcohols such as ethylene glycol, propylene glycol and the like. The use of these glycols improves the solubility characteristics and miscibility of the water-soluble salts with the linear surfactant polymers. The mixture of zinc chloride with the linear surfactant polymers in many cases improves their activity as emulsion breakers and coagulants.

To illustrate compositions of the linear surfactant polymers with the water-soluble salts, the following additional examples are presented:

EXAMPLE 9

11.7 ml. of Polymer 1 were blended with 4.5 ml. of a 60% $ZnCl_2$ solution and 8.8 ml. of water to give 25 ml. of a formulation containing approximately 15% $ZnCl_2$ by weight.

EXAMPLE 10

7.25 grams of Polymer 1 were blended with 9.1 grams of water and 14 grams of a 60% solution of $ZnCl_2$ to give 25 ml. of a formulation containing approximately 30% $ZnCl_2$ by weight.

EXAMPLE 11

13.2 ml. of Polymer 1 were blended with 10 ml. of a 50% by weight $Fe_2(SO_4)_3$ solution and 1.8 ml. of water to give 25 ml. of a formulation containing approximately 24% $Fe_2(SO_4)_3$ by weight.

EXAMPLE 12

7.4 ml. of Polymer 2 were blended with 4.5 ml. of a 60% $ZnCl_2$ solution, 2 ml. of isopropyl alcohol and 11.1 ml. of water to give a formulation containing approximately 15% $ZnCl_2$ by weight.

EXAMPLE 13

16.7 grams of Polymer 6 were blended with 5.1 grams of a 60% $ZnCl_2$ solution, 6.2 grams of water and 2.0 grams of isopropyl alcohol to give 30 grams of a formulation containing approximately 10% $ZnCl_2$ by weight.

EXAMPLE 14

10.6 ml. of Polymer 4, 80 ml. of 25% $AlCl_3$ solution and 9.4 ml. of water were blended to give 100 ml. of a formulation containing approximately 20% $AlCl_3$ by weight.

USES

The linear surfactant polymers of this invention are used in breaking both oil-in-water emulsions and water-in-oil emulsions in concentrations ranging from 0.001–1.0% by weight. The optimum concentration of polymer used to break a particular emulsion may vary within this range depending upon the type of polymer used as well as the nature, stability, and composition of the emulsion.

When used in waterflooding processes, the linear surfactant polymers are generally used in the concentration of 0.001–1.0% by weight.

To test the effectiveness of the polymers, the following experimental procedure was used:

160 ml. prescription bottles are filled to the 100 ml. mark with an oil-in-water emulsion, containing approximately 15% oil. Various dosages of the polymers were very effective in breaking the emulsions and separating the phases. Similarly, a water-in-oil emulsion was also tested and found to be equally adaptable to the polymers.

To test for use as coagulants (flocculants) for water clarification, a 500 ml. sample of water to be clarified is collected in an 800 ml. graduated beaker. While stirring with a paddle type agitator, various dosages of the polymers and polymer/metallic salt blends are introduced, and the degree of coagulation and water clarification are compared to a blank sample of the water.

We claim:

1. A linear surfactant polymer formed by the reaction of a substituted amine with a difunctional reactant wherein said substituted amine is the reaction product of hexamethylene triamine and propylene oxide, said hexamethylene triamine being reacted with propylene oxide in a molar ratio of 5:1 to 1:5 at a temperature of from 30°–220° C. for from 1-4 hours, and said difunctional reactant is a glycol adduct of epichlorohdyrin formed by the reaction of one mole of polyethylene glycol of molecular weight 250 with two moles of epichlorohydrin said reaction being conducted at temperatures in the range of 60°–110° C. for 1–3 hours under reflux, said difunctional reactant being reacted with the substituted amine in a molar ratio of 5:1 to 1:5 at a temperature of from 100°–250° C. for a period of time ranging from 1–6 hours.

2. A linear surfactant polymer formed by the reaction of a substituted amine with a difunctional reactant, wherein said substituted amine is the reaction product of hexamethylene triamine and ethylene oxide, said hexamethylene triamine being reacted with ethylene oxide in a molar ratio of 5:1 to 1:5 at a temperature of from 30°–220° C. for from 1–4 hours, and said difunctional reactant is a glycol adduct of epichlorohydrin formed by the reaction of one mole of polyethylene glycol of molecular weight 250 with two moles of epichlorohydrin said reaction being conducted at temperatures in the range of 60°–110° C. for 1–3 hours under reflux, said difunctional reactant being reacted with the substituted amine in a molar ratio of 5:1 to 1:5 at a temperature of from 100°–250° C. for a period of time ranging from 1–6 hours.

3. A linear surfactant polymer formed by the reaction of a substituted amine with a difunctional reactant, wherein said substituted amine is the reaction product of dipropylene triamine and propylene oxide, said dipropylene triamine being reacted with propylene oxide in a molar ratio of 5:1 to 1:5 at a temperature of from 30°–220° C. for from 1–4 hours, and said difunctional reactant is a glycol adduct of polyglycol and epichlorohydrin said reaction being conducted at temperatures in the range of 60°–110° C. for 1–3 hours under reflux, said difunctional reactant being reacted with the substituted amine in a molar ratio of 5:1 to 1:5 at a temperature of from 100°–250° C. for a period of time ranging from 1–6 hours.

4. A linear surfactant polymer formed by the reaction of a substituted amine with a difunctional reactant, wherein said substituted amine is the reaction product of hexamethylene diamine and a polyglycol adduct of epichlorohydrin formed by the reaction of four moles of mixed polyglycol with four moles of epichlorohydrin, said hexamethylene diamine being reacted with a polyglycol adduct of epichlorohydrin at a temperature of from 30°–220° C. for from 1–4 hours, said difunctional reactant is ethylene dichloride said difunctional reactant being reacted with the substituted amine in a molar ratio of 5:1 to 1:5 at a temperature of from 100°–250° C. for a period of time ranging from 1–6 hours.

5. A linear surfactant polymer formed by the reaction of a substituted amine with a difunctional reactant wherein said substituted amine is a reaction product of a mixture of hexamethylene diamine and hexamethylene triamine with a mixture of crude tall oil and a polyglycol reacted with one mole of epichlorohydrin, said hexamethylene diamine and hexamethylene triamine mixture being reacted with the tall oil and a polyglycol adduct formed by reacting a polyglycol with one mole of epichlorohydrin in a molar ratio of amine mixture to tall oil and polyglycol adduct of from 5:1 to 1:5 at a temperature of from 30°–220° C. for 1–4 hours, and said difunctional reactant is ethylene dichloride which is reacted with said substituted amine in a molar ratio of 5:1 to 1:5 at a temperature ranging from 100°–250° C. for a period of time ranging from 1–6 hours.

6. A linear surfactant polymer formed by the reaction of a substituted amine with a difunctional reactant wherein said substituted amine is the reaction product of a mixture of hexamethylene diamine and hexamethylene triamine and crude tall oil, said hexamethylene diamine and hexamethylene triamine mixture being reacted with the crude tall oil in a molar ratio of tall oil to amine of 5:1 to 1:5 at a temperature of from 30°–220° C. for from 1–4 hours, and said difunctional amine is ethylene dichloride, said difunctional reactant being reacted with the substituted amine in a molar ratio of 5:1 to 1:5 at a temperature of from 100°–250° C. for a period of time ranging from 1–6 hours.

7. A linear surfactant polymer formed by the reaction of a substituted amine with a difunctional reactant wherein said substituted amine is the reaction product of ethylene diamine and propylene oxide, said ethylene diamine being reacted with propylene oxide in a molar ratio of 5:1 to 1:5 at a temperature of from 30°–220° C. for from 1–4 hours, and said difunctional reactant is 1,4-dichlorobutene-2 said difunctional reactant being reacted with the substituted amine in a molar ratio of 5:1 to 1:5 at a temperature of from 100°–250° C. for a period of time ranging from 1–6 hours.

* * * * *